US009088956B2

(12) United States Patent
Cho et al.

(10) Patent No.: US 9,088,956 B2
(45) Date of Patent: Jul. 21, 2015

(54) METHOD AND SYSTEM FOR PROVIDING PHYSICAL CELL IDENTITY ASSIGNMENT IN HETEROGENEOUS NETWORKS

(71) Applicant: ELECTRONICS AND TELECOMMUNICATIONS RESEARCH INSTITUTE, Daejeon (KR)

(72) Inventors: Eun Seon Cho, Daejeon (KR); Chan Yong Lee, Daejeon (KR); Byung-Han Ryu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 8 days.

(21) Appl. No.: 14/166,918

(22) Filed: Jan. 29, 2014

(65) Prior Publication Data
US 2015/0017983 A1 Jan. 15, 2015

(30) Foreign Application Priority Data
Jul. 11, 2013 (KR) .................. 10-2013-0081571

(51) Int. Cl.
*H04W 40/00* (2009.01)
*H04W 60/00* (2009.01)
*H04W 16/00* (2009.01)
*H04L 12/24* (2006.01)
(52) U.S. Cl.
CPC ............... *H04W 60/00* (2013.01); *H04L 41/00* (2013.01); *H04W 16/00* (2013.01)

(58) Field of Classification Search
CPC ..... H04W 16/18; H04W 16/12; H04W 60/00; H04W 80/04
USPC .......................... 455/446, 447, 435.1; 370/328
See application file for complete search history.

(56) References Cited

U.S. PATENT DOCUMENTS

| 2008/0220779 | A1  | 9/2008  | Bose |
| 2009/0092122 | A1  | 4/2009  | Czaja et al. |
| 2009/0098890 | A1* | 4/2009  | Vasudevan et al. ........... 455/458 |
| 2009/0164547 | A1* | 6/2009  | Ch'ng et al. .................. 709/201 |
| 2010/0069062 | A1* | 3/2010  | Horn et al. .................... 455/434 |
| 2010/0151894 | A1* | 6/2010  | Oh et al. ....................... 455/509 |
| 2010/0173652 | A1* | 7/2010  | Nigam et al. ................. 455/458 |
| 2010/0238878 | A1* | 9/2010  | Jang ............................. 370/329 |
| 2010/0291897 | A1* | 11/2010 | Ghai ............................. 455/410 |
| 2011/0151870 | A1* | 6/2011  | Choi et al. ................. 455/435.1 |
| 2011/0250881 | A1* | 10/2011 | Michel et al. ................. 455/423 |
| 2012/0155384 | A1* | 6/2012  | Choi et al. .................... 370/328 |

FOREIGN PATENT DOCUMENTS

KR 10-2009-0037636 A 4/2009
KR 10-2010-0000901 A 1/2010

\* cited by examiner

*Primary Examiner* — Danh Le
(74) *Attorney, Agent, or Firm* — LRK Patent Law Firm

(57) ABSTRACT

A method of providing a physical cell identity (PCI) assignment by a management server for small-cell base stations (BSs) in a heterogeneous network environment includes setting a location coordinate and radius for the small-cell BSs; grouping every first preset number of small-cells together to define one femto zone; constructing a location map for each femto zone; grouping every second preset number of femto zones to define one femto group; and constructing a location map for each femto group.

14 Claims, 7 Drawing Sheets

METHOD AND SYSTEM FOR PROVIDING PHYSICAL CELL IDENTITY ASSIGNMENT IN HETEROGENEOUS NETWORKS

RELATED APPLICATIONS

This application claims the benefit of Korean Patent Application No. 10-2013-0081571, filed on Jul. 11, 2013, which is hereby incorporated by reference as if fully set forth herein.

FIELD OF THE INVENTION

The present invention relates to technology of a PCI (Physical Cell Identity) assignment, and more particularly, to a method for a PCI assignment based on a location map that is adapted for assigning PCIs to small BSs (Base Stations), which are installed in homes and offices of subscribers and located within a coverage of a macro BS, for example, HeNBs (Home evolved Node Bs) with a separate small-cell coverage in a heterogeneous network environment.

BACKGROUND OF THE INVENTION

PCIs of BSs, which are used as identification information of the physical layer, are one of the configuration parameters requisite for radio cells that are set at the initial installation of the BSs. A PCI is a parameter in which a UE (User Equipment) identifies a cell and serves as information such that the UE acquires the synchronization of a BS.

The PCI includes a unique combination of one orthogonal sequence and one pseudorandom sequence. Because only a limited number of 504 PCIs are supported, the same PCIs are necessarily reused in other cells. Further, BSs that are newly installed need to select the PCIs for their cells.

Both conditions of being collision-free and confusion-free should be satisfied in order to achieve a PCI assignment. The collision-free and confusion-free conditions are defined by the 3GPP (3rd Generation Partnership Project) 36.902 as follows:

Collision-free: a PCI is unique in the area that the cell covers.
Confusion-free: a cell shall not have neighboring cells with identical PCI.

Additionally, in recent years, small BSs to provide communication services with one to four subscribers, for example, femto cells that are private BSs, are installed indoors. The small BSs are located within the area of a macro BS with a wide radius in an outdoor space. In particular, a large number of small BSs exist in urban environments.

Further, the small BS is allowed to turn-on/off electrical power by a user's request. However, if the small BS is turned-on again, the small BS should be re-assigned with a new PCI and configuration information.

Therefore, in order to accommodate the above-described property of the small BSs and manage large numbers of small BSs, it is essential that an operation server, such as HeMS system, including SON (Self-Organizing Networks) functionality, plays a key role.

SUMMARY OF THE INVENTION

In view of the above, the present invention provides a technology for a PCI assignment, which is capable of satisfying the collision-free and confusion-free conditions when operating small-cell BSs such as HeNBs.

Further, the present invention provides a technology for assigning PCIs of small-cell BSs using location map information constructed previously in a HeMS server on a basis of a location of the small-cell BSs.

In accordance with an embodiment of the present invention, there is provided a method of providing a physical cell identity (PCI) assignment by a management server for small-cell base stations (BSs) in a heterogeneous network environment, which includes: setting a location coordinate and radius for the small-cell BSs; grouping every first preset number of small-cells together to define one femto zone; constructing a location map for each femto zone; grouping every second preset number of femto zones to define one femto group; and constructing a location map for each femto group.

In the embodiment, wherein said constructing a location map for each femto zone comprises assigning PCIs to the every second preset number of femto zones.

In the embodiment, wherein said configuring a location map for each femto zone comprises assigning a PCI from a center of the every first preset number of small-cells and assigning adjacent PCIs in a clockwise direction in sequence.

In the embodiment, wherein said constructing a location map for each femto group comprises grouping femto zones in an area starting from a center of the each femto group and adjacent in a clockwise direction in sequence to define one specific femto group.

In the embodiment, wherein said each femto group is composed of the second preset number of femto zones.

In the embodiment, the method further comprising, setting PCIs and a neighbor cell list to the location map of the small-cell BSs.

In the embodiment, wherein the neighbor cell list comprises information about PCIs assigned to one or more small-cells adjacent to any small-cell having its PCI.

In the embodiment, wherein setting a location coordinate and radius for small-cell BSs comprises: for a location map based on a macrocell BS, setting the location coordinate and radius of the small-cell BSs with a location coordinate of the macrocell BS as a reference; and for a location map not based on a macrocell BS, setting the location coordinate and radius of the small-cell BSs with an arbitrary location coordinate as a reference.

In accordance with another embodiment of the present invention, there is provided a system of providing a physical cell identity (PCI) assignment in a heterogeneous network environment, which comprising: small-cell BSs, each small-cell BS being adapted to search its location information and generate a registration requesting message including the location information; a management server, in response to the registration request message, adapted to group every first preset number of the small-cells together to define one femto zone, assign PCIs to every femto zone, group every second preset number of the femto zones to define one femto group, and reuse the same PCIs between other femto groups.

In the embodiment, wherein the management server is further adapted to assign a neighbor cell list of the PCIs pursuant to the location of the first preset number of the small-cells.

In the embodiment, wherein the management server is further adapted to configure the PCIs and the neighbor cell list as configuration information of the small-cell BS to forward the same to the small-cell BS.

In the embodiment, wherein the management server is further adapted to assign PCIs to small-cells starting from a center of the every first preset number of small-cells and adjacent to the center in a clockwise direction in sequence and construct a location map of each femto zone.

In the embodiment, wherein the management server is further adapted to group femto zones in an area starting from a center of the each femto group and adjacent in a clockwise direction in sequence to define one specific femto group.

In the embodiment, wherein the small-cell comprises any one of a femto cell, a pico cell, or a micro cell.

In accordance with the embodiments of the present invention, the PCIs of the small-cell BSs are assigned while satisfying the collision-free and confusion-free conditions; therefore, it is possible to minimize the collision among the small-cell BSs and maintain a smooth system operation.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

Moreover, the respective blocks or the respective sequences may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

Hereinafter, the embodiments of the present invention will be described in detail with reference to the accompanying drawings.

Figure 1:
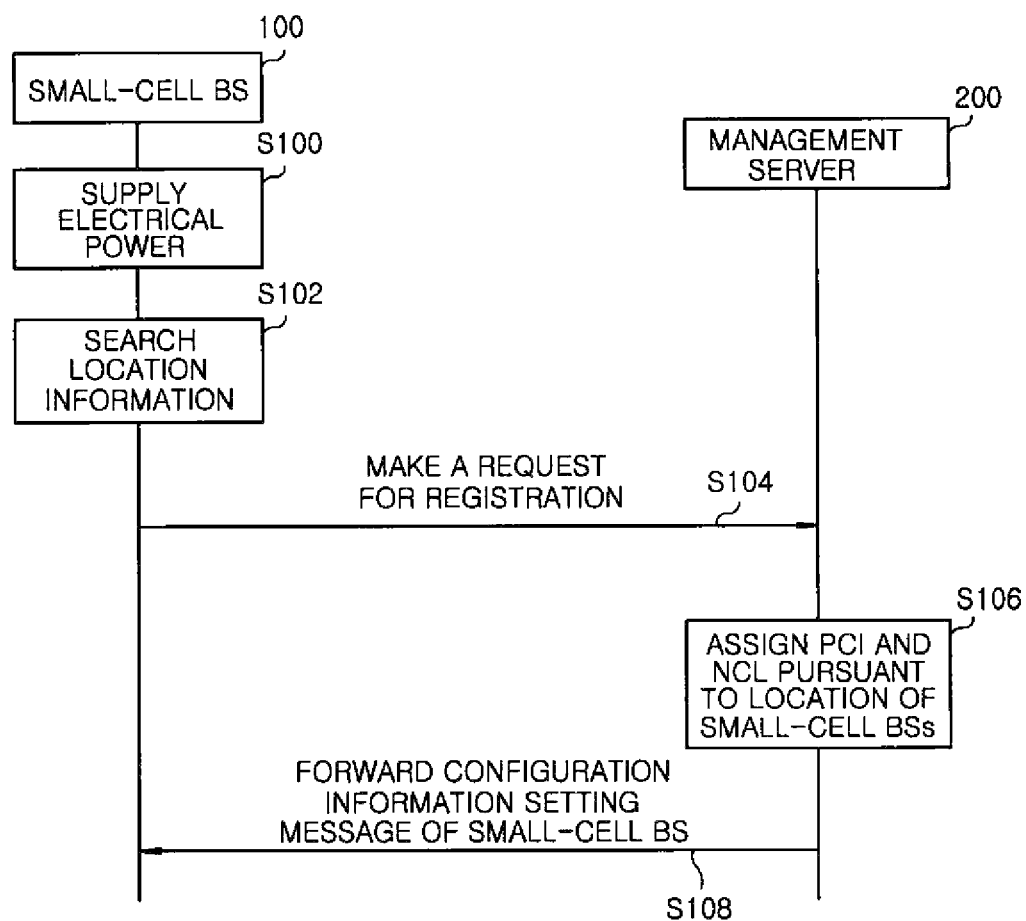
FIG. 1 is an overall flow diagram schematically illustrating a method of providing a PCI assignment that is performed in a PCI assignment system in a heterogeneous network environment in accordance with an embodiment of the present invention.

FIG. 1 shows an overall flow diagram schematically including a method for a PCI assignment in a heterogeneous network environment in accordance with an embodiment of the present invention.

A system for implementing a PCI assignment method of the embodiment may include a small-cell BS (Base Station) 100 and a management server 200 for the small-cell BS.

The small-cell BS 100 refers to a BS having small-cell coverage, which identifies its location information and forwards a registration request message to the management server 200. The term "small-cell" used herein refers to the opposite concept of a macrocell and may include a femto cell, a pico cell, a micro cell and the like. In the embodiment of the present invention, the small-cell is intended to be represented as a BS having femto cell coverage, e.g., a HeNB (Home evolved Node B).

Upon receiving the registration request message from the small-cell BS 100, the management server 200 serves to assign a PCI and a neighbor cell list (hereinafter referred to as an NCL) pursuant to the location of the small-cell BS and forward a configuration information setting message to the small-cell BS 100.

Hereinafter, the PCI assignment method will be further described along with the configuration as set forth above.

As shown in FIG. 1, when electrical power is supplied to the small-cell BS 100 in an operation S100, the small-cell BS 100 searches its location information in an operation S102.

After searching the location information, the small-cell BS 100 forwards a registration request message including the location information to the management server 200 in an operation S104.

In response to the registration request message from the small-cell BS 100, the management server 200 assigns a PCI and NCL pursuant to the location of the small-cell BS in accordance with an embodiment of the present invention.

More specifically, when receiving the registration request message from the small-cell BS 100, the management server 200 performs a process of providing the assignment of the PCI and NCL pursuant to the location of the small-cell BS using predetermined location map information.

After the completion of the assignment of the PCI and NCL, the management server 200 sends a configuration information setting message for the small-cell BS including the PCI and NCL information to the small-cell BS 100 in an operation S108.

Figure 2:
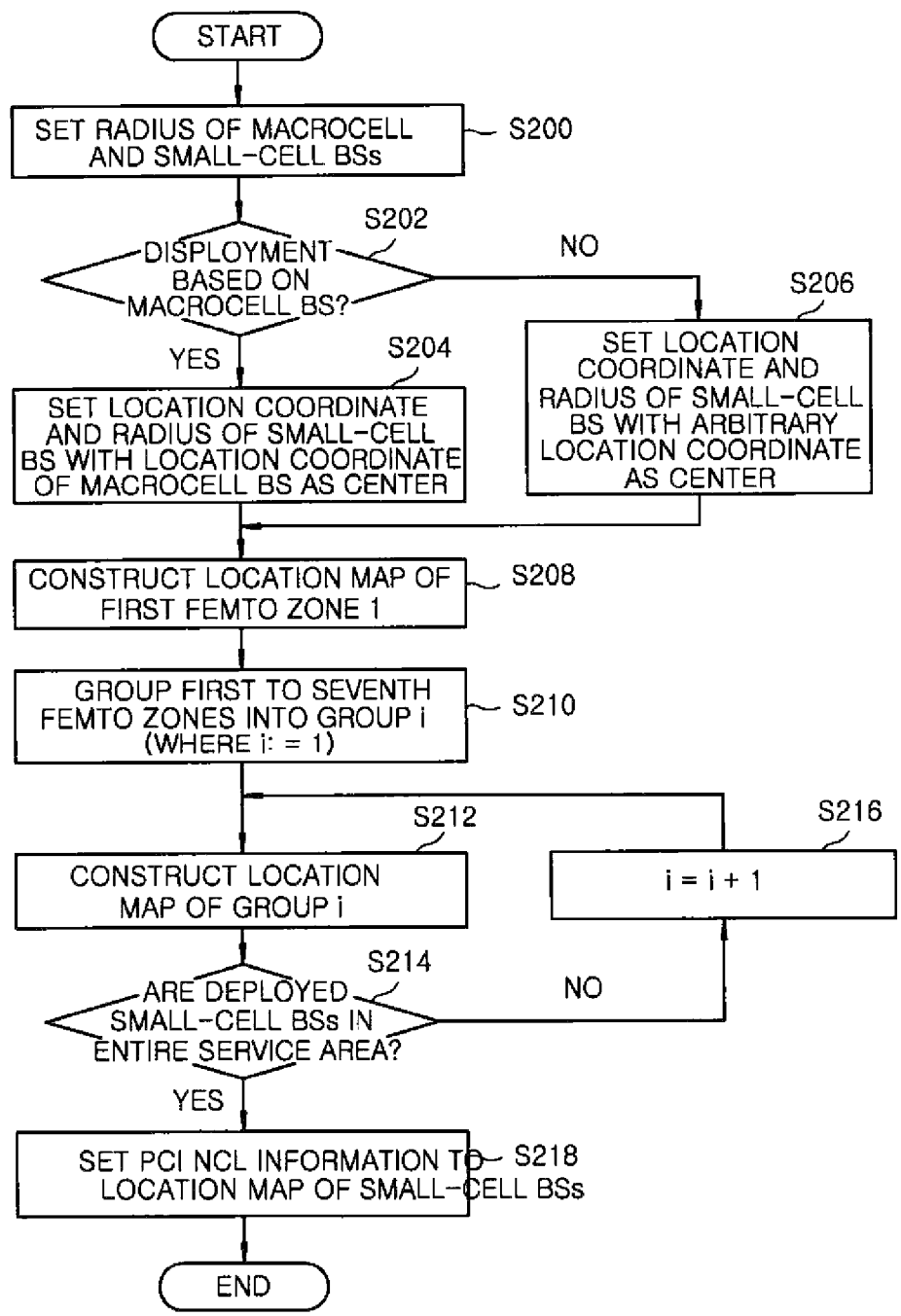
FIG. 2 is a flow diagram specifically illustrating a method of providing a PCI assignment in a heterogeneous network environment in accordance with an embodiment of the present invention.

FIG. 2 specifically illustrates the operation S106 of assigning the PCI and NCL, which is a flow diagram illustrating a method of constructing a location map in the management server 200 in accordance with an embodiment of the present invention.

The PCI assignment method of the embodiment begins with an operation S200 to set a radius of a macrocell BS and a small-cell BS.

For a deployment based on a macrocell BS, in an operation S202, a location coordinate and radius of the small-cell BS 100 may be set with a location coordinate of a macrocell BS as a reference in an operation S204.

Figure 3:
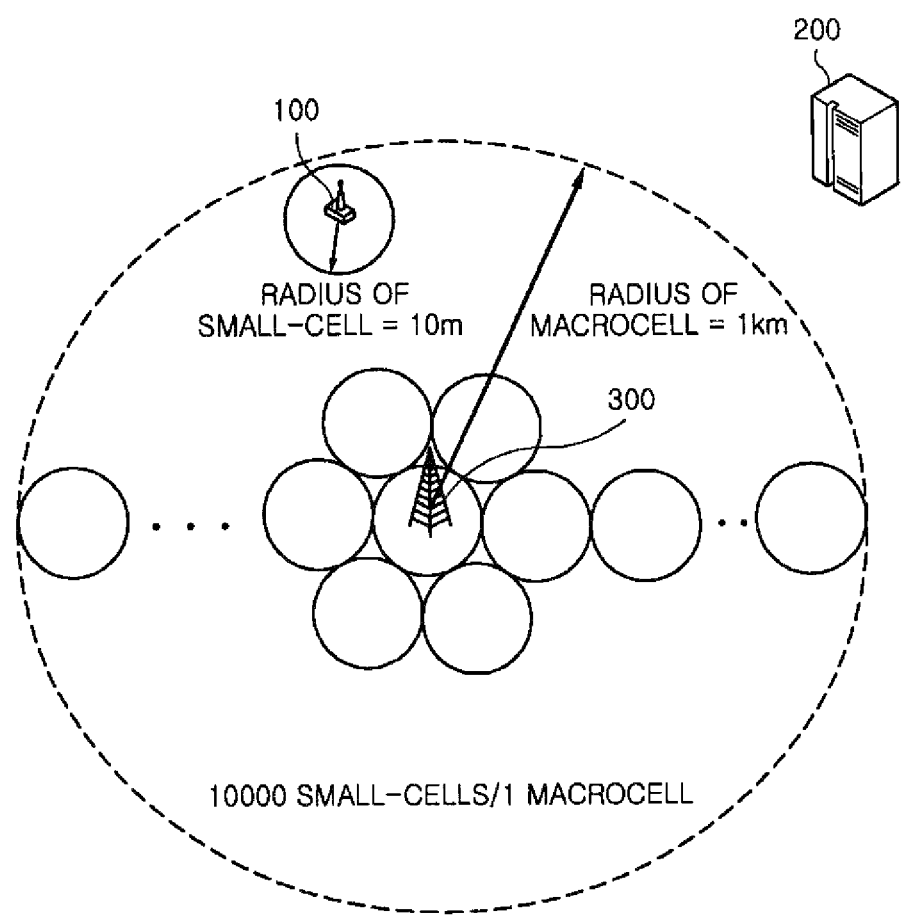
FIG. 3 illustrates an exemplary diagram in which a location coordinate and radius of small-cell BSs are set with a location coordinate of a macrocell BS as a reference under the PCI assignment method of FIG. 2.

FIG. 3 represents an embodiment illustrating a method of deploying small-cell BSs with the macrocell BS as a reference in a wireless communications system in which macrocell BS and a plurality of small-cell BSs are installed all together.

Assuming that a radius of a macrocell BS is up to 1 kilometer and a radius of each small-cell BS is about 10 meters or less, a number of about 10,000 small-cell BSs can be dispersed within a service area of the macrocell BS.

In the embodiment indicated in FIG. 3 based on the assumption that a macrocell BS 300 is located at a center of a macrocell, the embodiment is dispersed virtually to all location areas where small-cells will be deployed around the macrocell BS 300. Such dispersion makes it a rule to assign one PCI to one small-cell area.

Meanwhile, in the operation S202 of FIG. 2, for a deployment not based on a macrocell BS, a location coordinate and radius of the small-cell BS may be set with an arbitrary specific location coordinate as a reference in an operation S206.

Figure 4:
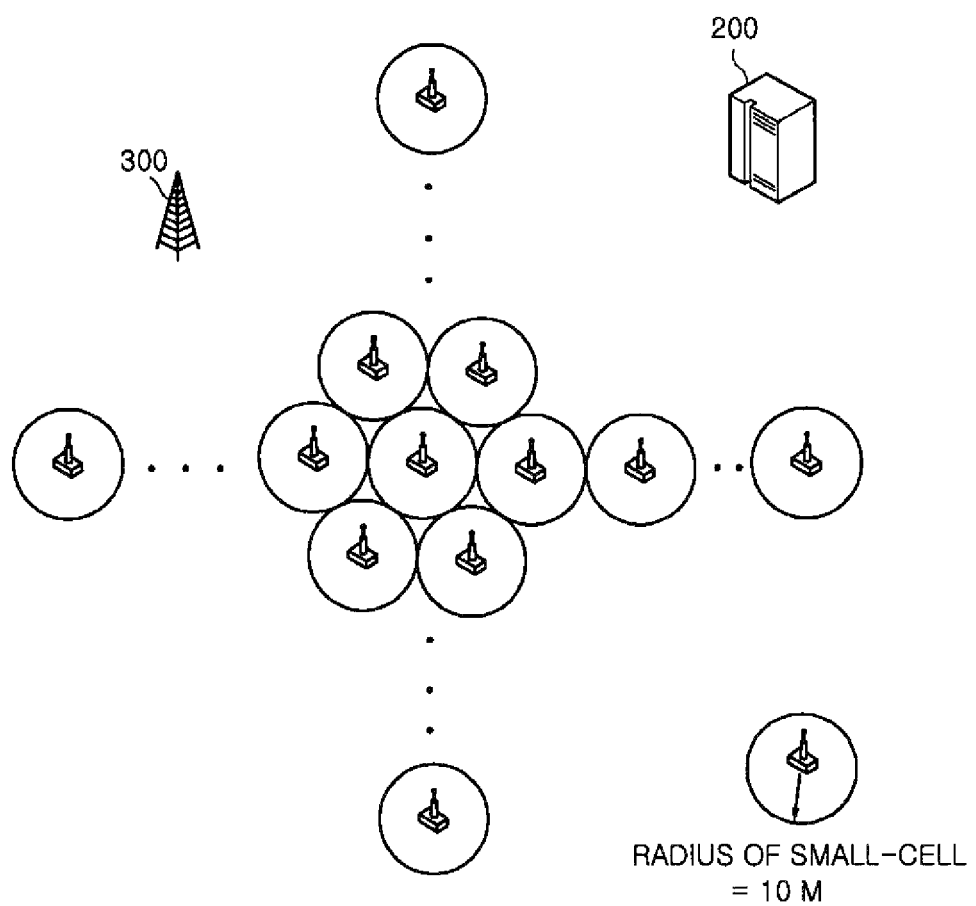
FIG. 4 illustrates an exemplary diagram in which location coordinate and radius of small-cell BSs are set with an arbitrary location coordinate as a reference under the PCI assignment method of FIG. 2.

FIG. 4 illustrates an embodiment of a method of deploying a plurality of small-cell BSs with an arbitrary location (specific coordinate) as a reference in a wireless communications system in which a macrocell BS and the small-cell BSs are installed all together.

With continuing reference to FIG. 2, a location map for a first femto zone is constructed using a reference coordinate in an operation S208, the first femto zone to a seventh femto zone are bound together to define a femto group i (i.e., i:=1) in an operation S210, and a location map for a femto group 1 is constructed in an operation S212.

The construction of the location map continues until the areas of the small-cell BSs are deployed in an entire service area in an operation S214 while increasing an index i of the group by one (1) in an operation S216.

Finally, the PCI and NCL information are configured to the location map for the small-cell BSs in an operation S218.

Figure 5:
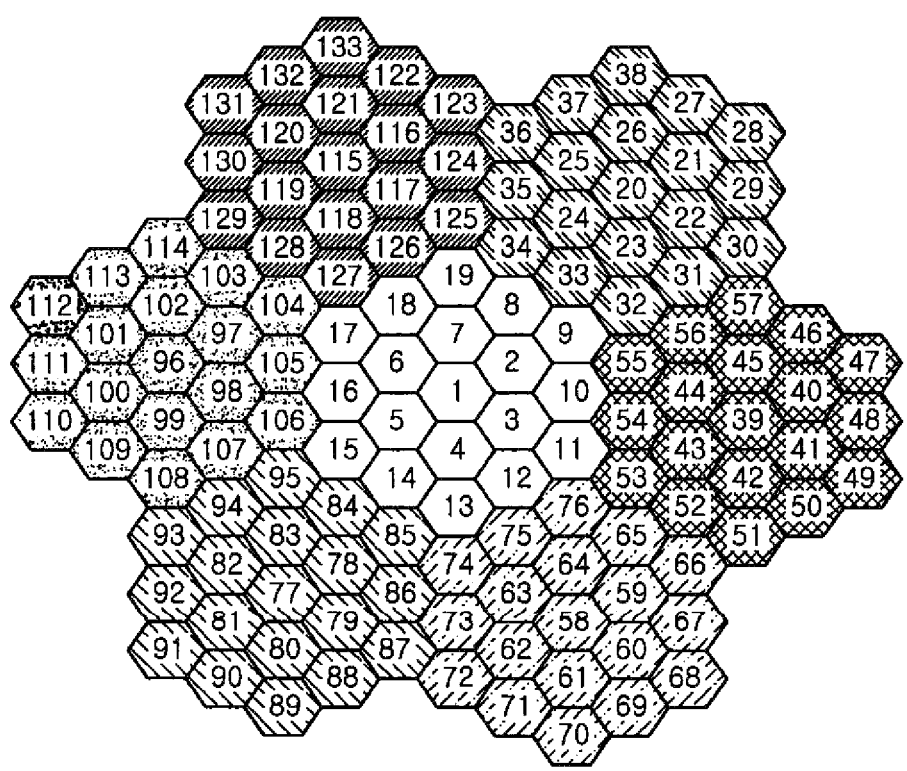
FIG. 5 illustrates an exemplary diagram in which a PCI assignment is made to every femto zone composed of small-cell areas of FIG. 3 or FIG. 4 that are virtually dispersed.

FIG. 5 illustrates a method of constructing the location map and small-cell areas, i.e., femto zones, for a PCI assignment pursuant to the location of the small-cell BSs, which depicts a method for a PCI assignment to the small-cell areas that are dispersed virtually in FIG. 3 or 4.

As illustrated in FIG. 5, every first preset number of small-cells, e.g., a number of 19 small-cells are grouped together to define one femto zone, and PCI values are then assigned to the respective femto zones as follows:

Femto Zone 1: PCI 1~PCI 19
Femto Zone 2: PCI 20~PCI 38
Femto Zone 3: PCI 39~PCI 57
Femto Zone 4: PCI 58~PCI 76
Femto Zone 5: PCI 77~PCI 96
Femto Zone 6: PCI 96~PCI 114
Femto Zone 7: PCI 115~PCI 133

Alternatively indicated, the management server 200 groups the femto zones into a second preset number of femto zones, i.e., a number of seven femto zones, each having the number of 19 small-cells. Consequently, only 133 PCIs among 504 PCTs can be used for the PCI assignment to the seven femto zones.

In this case, assigning PCIs to the small-cells included in each femto zone is achieved in such a manner that a PCI value is assigned first from a center of the femto zone, and subsequent PCI values are assigned in a clockwise direction in sequence.

When the PCI assignment to a first femto zone (PCI 1~PCI 19) is completed, the following femto zones are arranged in a clockwise direction in sequence, and another PCI assignment is similarly performed on the following femto zones, thereby constructing the location map to which PCI values (PCI 1 to PCI 133) are assigned.

Figure 6:
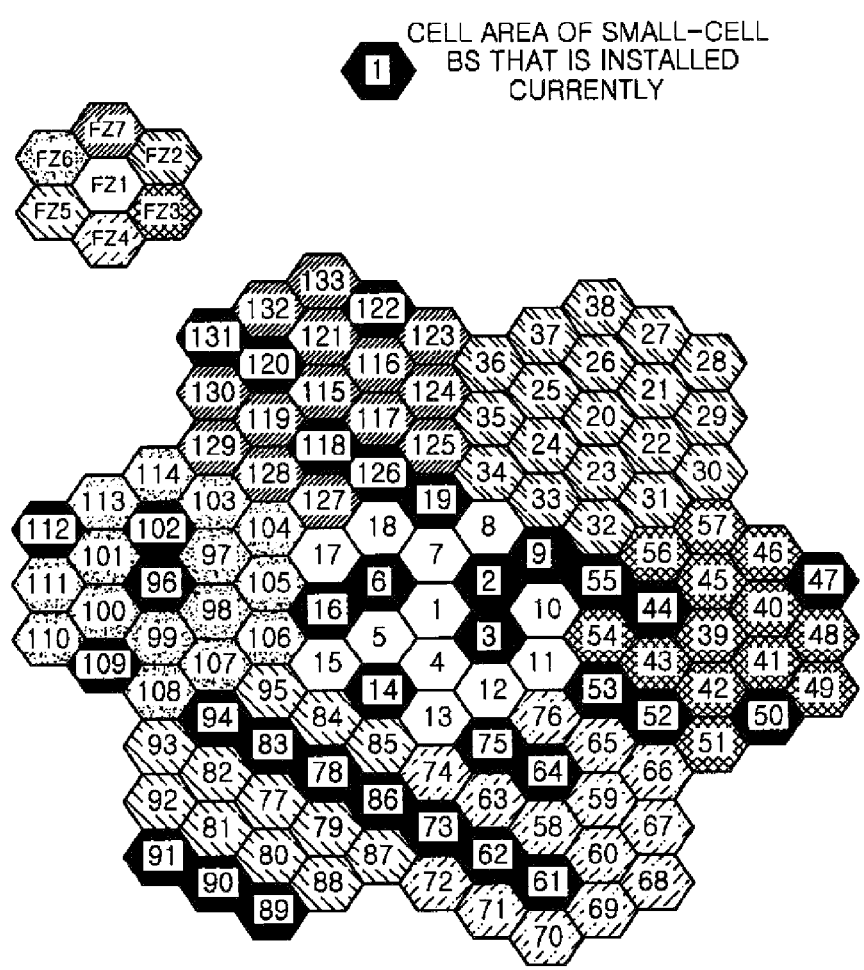
FIG. 6 depicts locations where small-cell BSs are actually installed, and PCI values that are assigned pursuant to the locations, e.g., a map configuration for locations of the femto zones of FIG. 5.

FIG. 6 illustrates the locations on which small-cell BSs are actually deployed and the locations in which the PCI values are assigned through the use of the PCI assignment method of FIG. 2, that is, the construction of the location map for the femto zones of FIG. 5

In the PCI assigned location map as illustrated in FIG. 6, a cell highlighted in dark represents one of the small-cell BSs that are being registered and operated at present.

If one small-cell BS is newly installed and then makes a request for registration, the small-cell area of the small-cell BS will be identified from the location information of the small-cell BS on a basis of the PCI assigned location map, and a corresponding PCI value will be assigned to the small-cell BS.

When assigning the PCI value, the management server 200 forwards NCL information for the small-cell BS along with the PCI value to the small-cell BS.

For example, in FIG. 6, NCL information of a PCI 2 indicates a PCI 3 and a PCI 9; NCL information of a PCI 3 indicates a PCI 2; NCL information of a PCI 6 is a PCI 16; and NCL information of a PCI 9 is a PCI 2 and a PCI 55. In addition, NCL information of a PCI 14 is null; NCL information of a PCI 16 indicates a PCI 6; and NCL information of a PCI 19 indicates a PCI 126.

The management server 200 assigns the PCI and NCL information, defines the information as the configuration information of the small-cell BS, and then forwards the configuration information to the small-cell BS 100.

Figure 7:
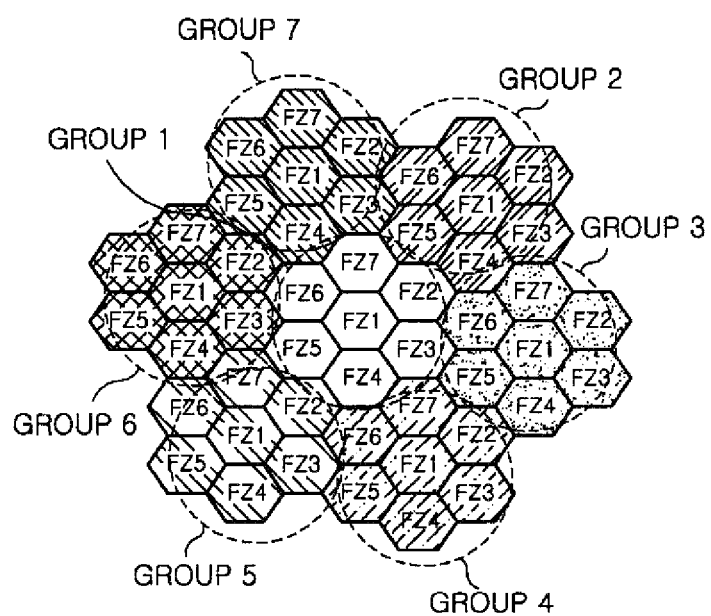
FIG. 7 illustrates an exemplary diagram in which a preset number of femto zones (a first to seventh femto zones) are grouped together to define one femto group under the PCI assignment method of FIG. 2.

FIG. 7 shows an embodiment in which every preset number of femto zones (first to seventh femto zones) are grouped together to define one femto group under the PCI assignment method of FIG. 2, which particularly depicts how to reuse the PCIs by grouping seven femto zones as one femto group.

As in the PCI assignment method of FIG. 5, the embodiment of FIG. 7 groups every first to seventh femto zone together to define a femto group and enables the femto zones in each femto group to reuse PCI information while satisfying both collision-free and confusion-free conditions in an entire service area.

More specifically, in FIG. 5, first to seventh femto zones are grouped together to define a first femto group; first to seventh femto zones in another area adjacent to a center of the macrocell in a clockwise direction are grouped together to define a second femto group; first to seventh femto zones in another area adjacent to the second femto group in a clockwise direction are grouped together to define a third femto group; first to seventh femto zones in another area adjacent to the third femto group in a clockwise direction are grouped together to define a fourth femto group; first to seventh femto zones in another area adjacent to the fourth femto group in a clockwise direction are grouped together to define a fifth femto group; first to seventh femto zones in another area adjacent to the fifth femto group in a clockwise direction are grouped together to define a sixth femto group; and first to seventh femto zones in another area adjacent to the sixth femto group in a clockwise direction are grouped together to define a seventh femto group.

As set forth above, according to the embodiment, every first preset number of small-cells is defined as one femto zone, PCI values are assigned to the respective femto zones, every second preset number of femto zones is defined as one femto group, and the same PCI values are reused or shared in the individual femto groups. Therefore, it is possible to satisfy the collision-free and confusion-free conditions through the location information for the small-cell BSs, which results in minimizing the collision between the PCIs and maintains a smooth system operation.

What is claimed is:

1. A method of providing a physical cell identity (PCI) assignment by a management server for small-cell base stations (BSs) in a heterogeneous network environment, the method comprising:
   setting a location coordinate and radius for the small-cell BSs;
   grouping every first preset number of small-cells together to define one femto zone;
   constructing a location map for each femto zone;
   grouping every second preset number of femto zones to define one femto group; and
   constructing a location map for each femto group.

2. The method of claim 1, wherein said constructing a location map for each femto zone comprises assigning PCIs to the every second preset number of femto zones.

3. The method of claim 1, wherein said configuring a location map for each femto zone comprises assigning a PCI from a center of the every first preset number of small-cells and assigning adjacent PCIs in a clockwise direction in sequence.

4. The method of claim 1, wherein said constructing a location map for each femto group comprises grouping femto zones in an area starting from a center of the each femto group and adjacent in a clockwise direction in sequence to define one specific femto group.

5. The method of claim 4, wherein said each femto group is composed of the second preset number of femto zones.

6. The method of claim 1, further comprising:
   setting PCIs and a neighbor cell list to the location map of the small-cell BSs.

7. The method of claim 6, wherein the neighbor cell list comprises information about PCIs assigned to one or more small-cells adjacent to any small-cell having its PCI.

8. The method of claim 1, wherein setting a location coordinate and radius for small-cell BSs comprises:
   for a location map based on a macrocell BS, setting the location coordinate and radius of the small-cell BSs with a location coordinate of the macrocell BS as a reference; and
   for a location map not based on a macrocell BS, setting the location coordinate and radius of the small-cell BSs with an arbitrary location coordinate as a reference.

9. A system of providing a physical cell identity (PCI) assignment in a heterogeneous network environment, the system comprising:
   small-cell BSs, each small-cell BS being adapted to search its location information and generate a registration requesting message including the location information;
   a management server, in response to the registration request message, adapted to group every first preset number of the small-cells together to define one femto zone, assign PCIs to every femto zone, group every second preset number of the femto zones to define one femto group, and reuse the same PCIs between other femto groups.

10. The system of claim 9, wherein the management server is further adapted to assign a neighbor cell list of the PCIs pursuant to the location of the first preset number of the small-cells.

11. The system of claim 10, wherein the management server is further adapted to configure the PCIs and the neighbor cell list as configuration information of the small-cell BS to forward the same to the small-cell BS.

12. The system of claim 9, wherein the management server is further adapted to assign PCIs to small-cells starting from a center of the every first preset number of small-cells and adjacent to the center in a clockwise direction in sequence and construct a location map of each femto zone.

13. The system of claim 9, wherein the management server is further adapted to group femto zones in an area starting from a center of the each femto group and adjacent in a clockwise direction in sequence to define one specific femto group.

14. The system of claim 9, wherein the small-cell comprises any one of a femto cell, a pico cell, or a micro cell.

* * * * *